(12) United States Patent
Lange

(10) Patent No.: US 11,065,546 B1
(45) Date of Patent: Jul. 20, 2021

(54) DISTRIBUTED AUTHORITY FOR PEER GAMING

(71) Applicant: Amazon Technologies, Inc., Reno, NV (US)

(72) Inventor: Christian R. Lange, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 15/868,553

(22) Filed: Jan. 11, 2018

(51) Int. Cl.
| | |
|---|---|
| A63F 13/75 | (2014.01) |
| A63F 13/34 | (2014.01) |
| A63F 13/92 | (2014.01) |
| A63F 13/79 | (2014.01) |
| A63F 13/71 | (2014.01) |
| A63F 13/35 | (2014.01) |
| A63F 13/31 | (2014.01) |
| A63F 13/332 | (2014.01) |

(52) U.S. Cl.
CPC .............. *A63F 13/75* (2014.09); *A63F 13/31* (2014.09); *A63F 13/34* (2014.09); *A63F 13/35* (2014.09); *A63F 13/71* (2014.09); *A63F 13/79* (2014.09); *A63F 13/92* (2014.09); *A63F 13/332* (2014.09); *A63F 2250/58* (2013.01); *A63F 2300/404* (2013.01); *A63F 2300/407* (2013.01)

(58) Field of Classification Search
CPC .......... A63F 13/75; A63F 13/79; A63F 13/35; A63F 13/34; A63F 13/71
See application file for complete search history.

(56) References Cited

U.S. PATENT DOCUMENTS

| | | | | |
|---|---|---|---|---|
| 8,571,882 | B1 * | 10/2013 | Teitelbaum | G06F 16/27 705/2 |
| 2004/0255032 | A1 * | 12/2004 | Danieli | A63F 13/12 709/229 |
| 2008/0235391 | A1 * | 9/2008 | Painter | H04N 7/17318 709/232 |
| 2009/0305778 | A1 * | 12/2009 | Yu | A63F 13/10 463/29 |
| 2016/0203522 | A1 * | 7/2016 | Shiffert | H04W 76/14 705/14.58 |
| 2018/0173747 | A1 * | 6/2018 | Baird, III | G06F 16/2365 |
| 2019/0182257 | A1 * | 6/2019 | Lee | G06Q 20/10 |
| 2019/0207751 | A1 * | 7/2019 | Harvey | H04L 9/0637 |
| 2019/0215149 | A1 * | 7/2019 | Ramasamy | G06N 3/02 |

* cited by examiner

*Primary Examiner* — James S. McClellan
(74) *Attorney, Agent, or Firm* — Hogan Lovells US LLP

(57) ABSTRACT

An application can be executed for multiple peers using a peer-to-peer network structure. State data for the peers can be compared to provide for authority on the session even though there is no dedicated authority component. Such an approach can help to maintain consistency across the distributed network, as well as to minimize the occurrence of cheating or manipulation of the data on the session. A set of state variables is selected, and peers use their local values for those variables to generate hashes to be sent to the other peers. The hash values are compared and any variations addressed accordingly. For any outlier peers that report different hash values, their state values can be adjusted to attempt to bring those outliers back in sync with the other peers. This can involve updating or rolling back specific parameter values for the outlier or all peers.

20 Claims, 8 Drawing Sheets

Consensus State Variables (time t) — 300

A _____ 1000

B _____ Expert

Outlier State Variables (time t) — 320

A _____ 1000

B _____ Expert

Outlier State Variables (time t) — 340

A _____ 1000

B _____ Expert

Last Valid State Variables (time t-x) — 360

A _____ 950

B _____ Expert

Reset State Variables (time 0) — 380

A _____ 0

B _____ Expert

DISTRIBUTED AUTHORITY FOR PEER GAMING

BACKGROUND

The widespread adoption of portable computing devices, such as smartphones and tablet computers, has resulted in a corresponding increase in the amount and types of electronic content available to players. The availability of large numbers of devices able to transmit and process this content has triggered a similar increase in online, multiplayer gaming. In many situations a number of game clients will be connected by a network to a gaming server that will act as the authority for the game. For performance reasons, in various situations a different networking structure, such as peer-to-peer, may be preferred over a central server-based approach. Such a structure also has the advantage of not requiring a significant amount of hardware and resource capacity as is utilized for a centralized game server-based approach. Peer-based approaches lack a centralized authority, however, which allows for at least some amount of cheating or other manipulations of the game by individual peer clients.

BRIEF DESCRIPTION OF THE DRAWINGS

Various embodiments in accordance with the present disclosure will be described with reference to the drawings, in which:

FIGS. 3A, 3B, 3C, 3D, and 3E illustrate an example approaches to accounting for variations in game state amongst a set of peer devices that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for authority in peer-to-peer networks. In particular, various approaches enable the state data for each peer on a session to be compared to determine whether there are any inconsistencies or outliers amongst the peers. Such an approach can help to maintain consistency across the distributed network, as well as to minimize the occurrence of cheating or manipulation of the data on the session. Such an approach is also highly scalable and provides for non-centralized authoritative application state management, as is useful for mobile games and other such applications. A set of state variables can be selected, and each peer can use their local values for those variables to generate a hash that can be sent to the other peers. The hashes can be generated and circulated at an appropriate frequency. The hash values can be compared and any variations addressed accordingly. Where the hash values do not all agree, it can first be determined whether a consensus value can be reached, such as a hash value that was reported by at least a consensus number of peers. For the other outlier peers, their state values can be adjusted to attempt to bring the outliers back in sync with the other peers. This can involve updating or rolling back specific parameter values, among other such options. If an outlier proves to be problematic over time, or meets another termination criterion, then that peer can be dropped from the session. If the peers rarely agree or have difficulty coming to consensus then the session can be restarted or terminated, among other such options.

Various other functions can be implemented within the various embodiments as well as discussed and suggested elsewhere herein.

Figure 1:
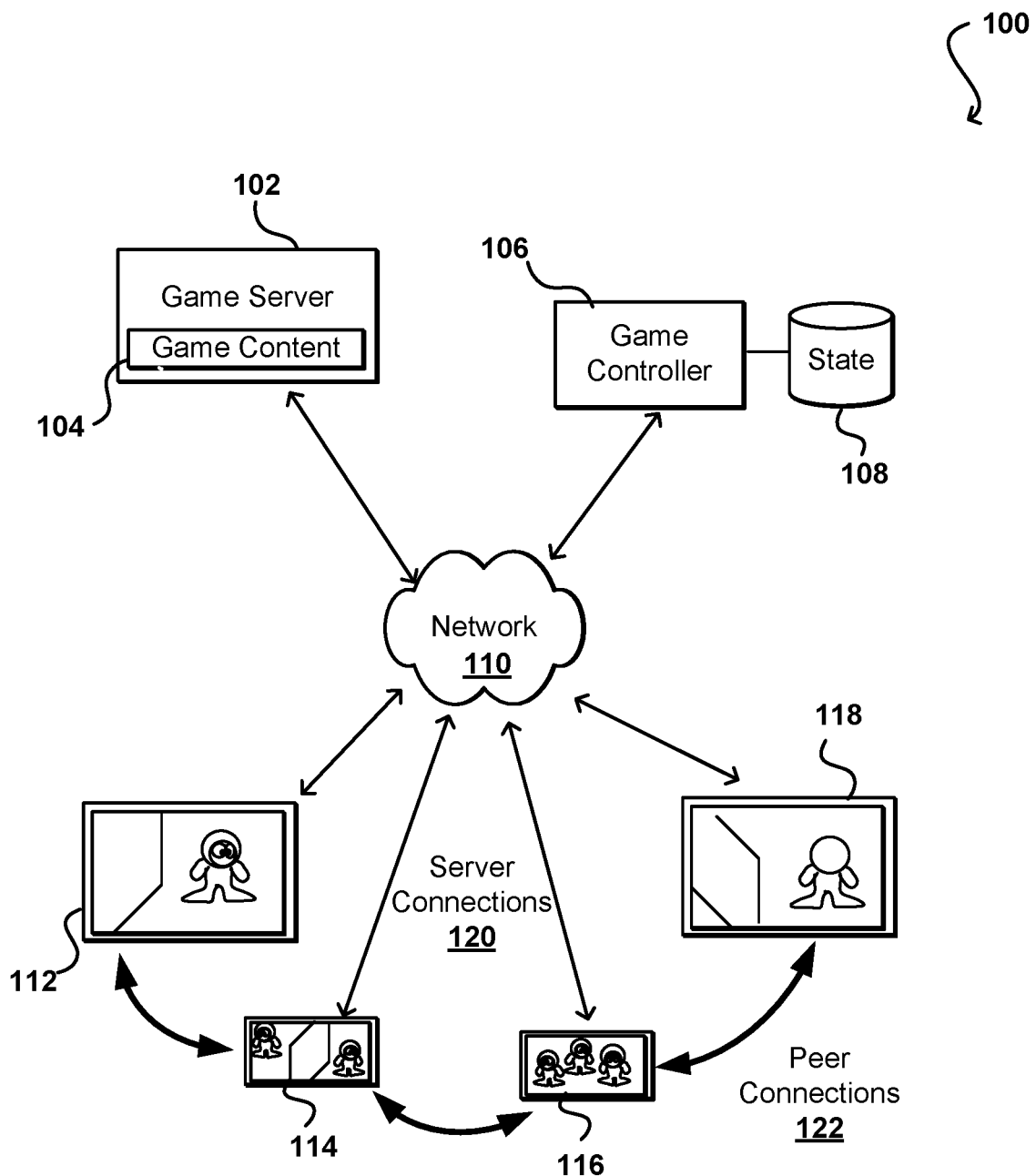
FIG. 1 illustrates an example network structure for a peer-based game that can be utilized in accordance with various embodiments.

FIG. 1 illustrates an example network structure 100 that can be used to provide for electronic gaming, or the accessing of other digital content, by a plurality of client devices. In this example, a number of client devices 112, 114, 116, 118 are participating in a session of an electronic game application. The game content can be stored on the devices, or obtained from a content repository 104 of a game server 102 from across one or more networks 110. When initiating a game, the client devices might send requests to the game server 102 or a game controller 106 that can collect requests and assign client devices to specific game sessions. A game controller 106 can then, for example, determine initial state data from a state data store 108 and other relevant game information and send that information across the network(s) 110 to the various client devices. It should be understood, however, that other approaches to distributing game content and initiating game sessions can be performed amongst the various peer client devices without a game server or controller in at least some embodiments.

In a conventional approach, a gaming application would be hosted on at least one game server 102. The game server 102 can be a local gaming machine or a remote server operated by a game provider, among other such options. In this example the game offers multiplayer capability, whereby multiple players can utilize respective devices 112, 114, 116, 118 to connect to the game server 102 over at least one network 110, such as the Internet, a local area network, a dedicated gaming network, a peer-to-peer network, or a cellular network, among other such options and combinations thereof. The players typically would join in a session of the game with state data that is managed by a game state component of the game server. In some embodiments one or more game servers 102 can execute the game, while in others the servers can manage game state for instances of the game executing on the various player devices. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative set of game state data. The server 102 can build up this information using data received from the various devices, and update the information based on updates to the received data. The server can maintain this data as part of the authoritative game state, and can send the information across the appropriate network(s) 110 to the various devices as appropriate. In other embodiments, however, at least some amount of game state data can be sent between devices independent of the game server 102, either through the network 110 or directly using a local communication protocol (e.g., Bluetooth or NFC). In situations where the data is sent between devices, the devices can either agree upon an authoritative data set or make local determinations for local rendering on the respective devices, among other such options.

As mentioned, there can be advantages to using approaches that do not require a single, central authority. For example, a centralized authority must receive the game state data from every participating device, generate or update the authoritative state data, then send at least a subset of the authoritative state data back to the individual devices. This provides a single point of failure for the game or session, and also is susceptible to issues with connection latency or quality for any of the devices on the session. If the game server is a significant distance away from the various devices, then the latency may impact the gameplay even if the connection quality is otherwise acceptable. An network structure 100 such as illustrated in FIG. 1 may enable the various client devices 112, 114, 116, 118 to contact the game server or controller as needed for game content or other information, but can otherwise communicate with each other using a peer-to-peer network to share and update state data. As illustrated in FIG. 1, instead of using the server connections 120 to send updates to the game server 102, which then sends the authoritative data back down to the devices, the client devices can share game updates directly among themselves using the peer connections 122. This can allow for much faster communications in some situations, and may provide for much less complex session management. Further, the ability to use a peer-based approach can significantly reduce the need for game servers and infrastructure to support a large number of games, sessions, and/or players.

A downside to such a peer-based approach, however, is that the lack of a central authority can enable individual peer devices on the game session to cheat or otherwise manipulate the game state. Since updates are based on messages sent from the individual client devices to each other, there may be no way to determine when one of the client devices (or another source) is modifying these messages, either by modifying the contents of the messages or the timing of the messages, among other such options. Modifying the timing of the messages can make a player more difficult to hit or locate, while modifying the content can enable a player to indicate a higher level of cash, skill, accomplishments, power, etc. Various other types of advantages can be gained as well as known for electronic and online gaming.

Accordingly, approaches in accordance with various embodiments provide for game authority in a peer-based network structure or topology. Such an approach can enable the game to operate without a central game authority, but can also prevent cheating or other negative impact on players to a game due to the lack of a central game authority. In some embodiments, game state information for a specified set of values is obtained from the individual devices at a regular interval, or at other appropriate times. If the values from the various devices all match, then the game can proceed under the current conditions and it can be determined that there is likely no manipulation occurring from any of the individual devices. If the values from one of the devices are different, then a determination can be made that there is a problem with that particular client device. This might be a glitch that resulted in an incorrect value, or set of values, or might reflect an attempt to manipulate the game state with respect to that device. Various remedial approaches can then be taken with respect to that device. If this is a first difference, or a rare occurrence, then an attempt might be made to update the game state for that device to the correct values, so that the device can continue to participate in the game session. If the errors for that device persist, then that device might be dropped from the gaming session or suspended from accessing sessions of that game, among other such options. In at least some embodiments a message might be sent to the user or owner of the device to indicate that there is a problem with the client, device, or installation, etc. If a certain behavior is observed over a period of time, such as to frequently display issues that correspond to an attempt to gain a competitive advantage, then that account may be banned from the environment or otherwise unable to access the online or networked portions of the game.

Figure 2:
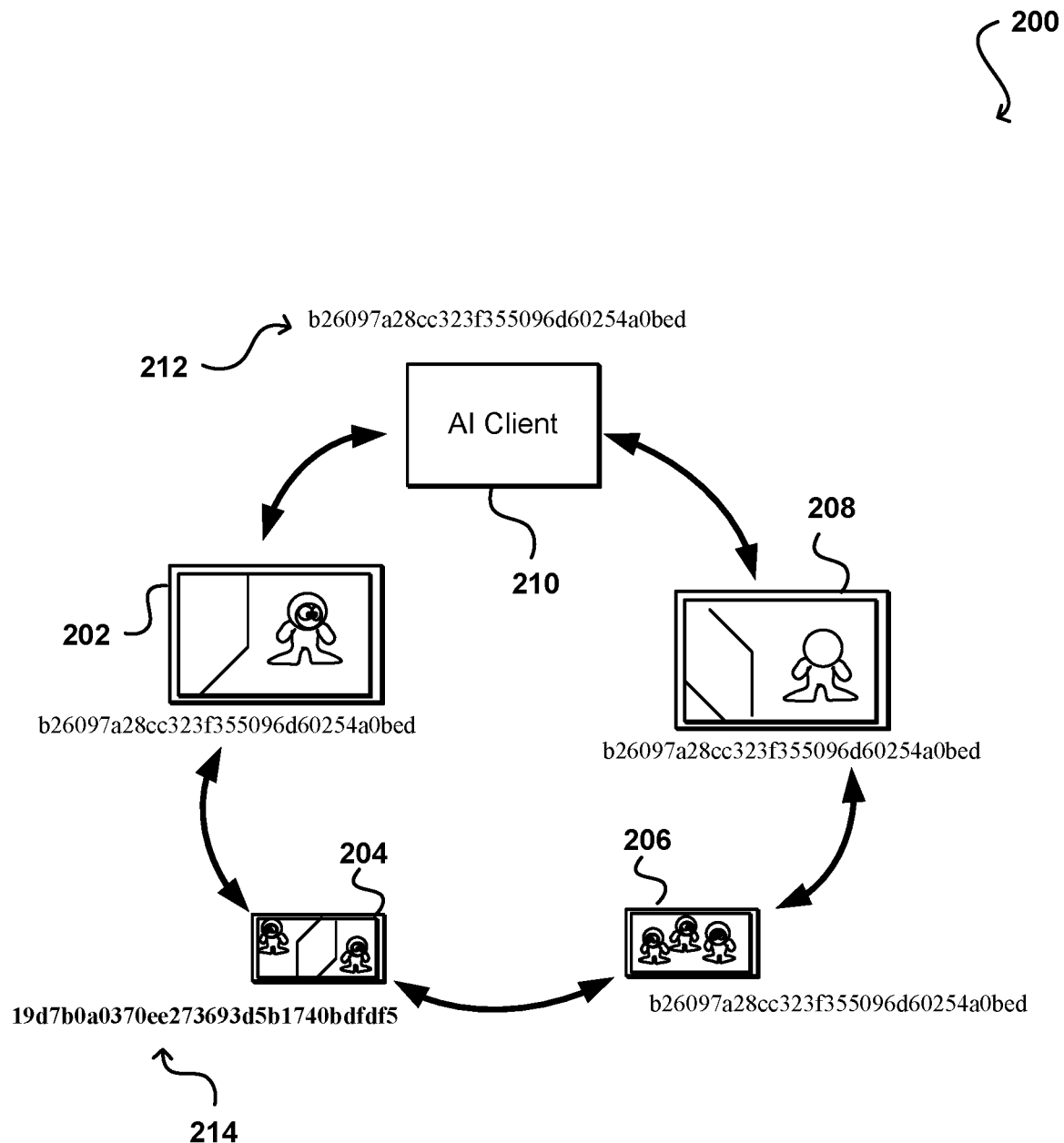
FIG. 2 illustrates an example consensus-based approach to managing game state that can be utilized in accordance with various embodiments.

Because there may be a significant number of values that are worthwhile to compare, or because the values may themselves be relatively long or complex, approaches in accordance with various embodiments can utilize a hashing algorithm, or other such approach, to produce a more lightweight string that can be quickly and easily compared. FIG. 2 illustrates an example configuration 200 wherein a set of peer devices 202, 204, 206, 208 for a game session are each able to generate hashes using a specified hashing algorithm, and share those hash values with the other peer using a peer-to-peer communication network topology. The hashing algorithm can be any appropriate secure hash algorithm, as may include SHA-2, MD5, and the like. If the clients are all using the same hashing algorithm, then the hash values generated from those devices should all be the same if the underlying state values are the same. This enables a single value to be shared and compared, with any outliers being simple to determine. In some embodiments there might be a consensus-based approach to game state management. For example, there might be a 1% chance on average of a client device having the wrong state data. For games where there may be thousands of players, this can result in tens of devices legitimately having the wrong state data at any time. In such an approach, the state data can be determined to be consistent or accurate if the hash values received from at least a minimum threshold number of devices match, such as at least 98% in some embodiments. If a consensus is unable to be generated then another action can be taken, such as to terminate the session or roll back to a last known good state, among other such actions.

In the example of FIG. 2, it can be seen that all but one of the client devices 202, 206, 208 are reporting the same hash 212, while one of the client devices 204 is reporting a different hash 214. A quick comparison of the hash values can determine an inconsistency, and can enable a quick determination of the client device associated with the inconsistency. In some embodiments any peer detecting an inconsistency can report this to the inconsistent device 204, but to prevent manipulation or cheating various approaches can require some or all of the other peer devices to indicate to the inconsistent device 204 that an issue was detected, or a peer that is selected to function as a local master for the session can determine the inconsistency and provide the communication, among other such options. If an inconsistency is detected with the local master peer, then a new master peer can be selected in some embodiments and the old master brought current with the authoritative game state.

It might be the case that all client devices to a session are cheating, such as where a player has set up multiple accounts and joined those accounts on a session for purposes of obtaining a specific result. In such an instance, the hashes from all those client devices might match, even though the values are a result of game manipulation. Accordingly, an artificial intelligence (AI) client 210 or other such device might be added as a participant (visible or undetectable to the other peer devices) to the game session such that it will generate a hash value 212 as well. In this way, even if the other player devices are all manipulated to generate the same incorrect hash, this hash will not match the hash generated by the AI client. In such an approach the AI client hash can be treated differently, such that a remedial action can be taken even if all the clients other than the AI client provide a consistent hash. The AI client 210 has may not necessarily be taken as authoritative, but the generation of a hash from the AI client that is different from the other devices can be taken as an indication that there is something potentially problematic with that session. In such a situation, the session may be terminated and data logged for the participating client devices that returned a suspiciously consistent but incorrect hash value.

In some embodiments a remedial action can be taken any time at least one of the devices reports inaccurate state data, such as where the hash value from that device does not match the hash values reported from the other peer devices on the game session. In one example, the hashing algorithm can be used to expand, from the hashes, the states of the individual values or objects for the game session. These values can then be analyzed and compared to determine the incorrect value(s). For example, the set of values 300 indicated in FIG. 3A illustrates the set of values that were provided in generated the hash that was provided for the consensus determination. The set of values 320 in FIG. 3B resulted in a hash that was an outlier with respect to the consensus hash. By expanding the hash a quick determination can be made as to the incorrect value, parameter, or setting. Once the incorrect value(s) is determined, the correct value(s) can then be sent, hashed, encrypted, or otherwise, to the corresponding client device to attempt to bring that client back to a consistent game state with the other devices. In other embodiments one or more peers can be instructed to send the current value to the specified client, to make sure the client has the most recent value. If the problem was a one-time glitch then this approach may bring all the client devices back to a consistent state. If the problem persists, the values will again differ and a different action can be taken, such as to drop that client device from the session, among other options discussed and suggested herein. In some embodiments the type of incorrect value may be indicative of a glitch versus a manipulation. For example, if the incorrect value relates to the name of a level or a number of players on the session, then the value may be determined to likely be a glitch. If the incorrect value provides the reporting player with an advantage with respect to skill, level, currency, etc., then it may be more suspicious. In some embodiments the values themselves may be analyzed for assistance in determining the cause for the glitch. For example, if the value for currency for a player is higher than otherwise reported then it may be an indication of cheating, while if the currency value is reported as "zero" and the player should otherwise have a significant amount of currency, then that may be indicative of a glitch. In the example 340 of FIG. 3C, the incorrect value for the outlier set can be adjusted to the proper current value as indicated by the consistent set. If the issue was the result of a random glitch or other such occurrence then the peers should be able to continue on the session without delay or negative impact.

As mentioned, another approach that can be utilized in accordance with various embodiments is to revert, or "roll back," the state for the client devices to the last known good state that was shared by the clients. This may not be appropriate for all types of games, but may provide advantage where possible. This approach can cause the values to be reverted to the last set 360 of values where there was no discrepancy, as illustrated in FIG. 3D. This can be applied not only to the inconsistent client(s), but to all client devices on the session. Such an approach can also be useful where no consensus can be reached, or where there are multiples devices with different values and the session is at risk of becoming unstable or otherwise problematic. Another example approach involves resetting the values for all the devices back to a default or initial set 380 of values, as illustrated in FIG. 3E, such as may have been provided at the start of the session. Such an approach could enable a cheating client device to negatively impact all the other clients on a session, however, and may not be a preferred solution for at least that reason.

Another advantage to such peer-based approaches is that they can be scalable even during a game session. Peers can be added and dropped from a session, and the hashes from any current peers to a game session can be aggregated and analyzed at the relevant times. When a peer is added to a game session, the current state data can be obtained from the game controller, another peer, or a master peer, among other such options. Further, if a hash or update is not received from a specific peer for a period of time, it may be assumed in some embodiments that the peer is unresponsive or unavailable and that peer can be dropped from the gameplay session. This can also account for the situation where the client may be attempting to manipulate the system without getting caught through the hash comparison.

For large scale games, such as mobile games with millions of players, such an approach can be preferable to a game developer than an expensive multi-tier client server infrastructure. A subset of the peers could be selected for sampling, in order to determine the consensus state information. This consensus state (e.g., the agreed-upon hash) can then be used to analyze any or all client devices on the session to determine whether any might need remedial action taken as discussed and suggested herein. As mentioned, for smaller numbers of devices an approach might compare the values for all the devices against each other, and the approach can vary with the number of players, types of devices, network conditions, or other such factors. The number of devices on a session can also impact other aspects as well, such as the frequency of the verification or the amount of data to be included in the hash, among other such options. Other factors such as network performance or device capability may be factored into these determinations as well within the scope of the various embodiments.

Other types of information can be compared as well within the scope of the various embodiments. The values may not necessarily relate to overall game state, but may relate to a set of actions or specific occurrences in the game as reported by a particular client. This might track recent actions of a particular player, such as to purchase an item, obtain an item, finish a task, jump across an obstacle, etc. The set of actions for a player device can then be compared against what the other devices indicate happened with respect to that player device, to attempt to determine whether the player device is submitting fraudulent information. Such an approach can also help to detect dropped messages, as an action reported by a client device that was not detected by the other devices may not necessarily point to malicious intent but may instead point to a dropped message or other glitch. Accordingly, the number or frequency of such occurrences may be used to determine the appropriate action to take, such as to update the authoritative set of actions for that player device or drop that player device from the session. Further, any inconsistencies may cause the checks to be more frequent (i.e., from every 15 seconds to every second) or thorough for at least a period of time, until it is determined that the session is operating as expected and the checks can return to a normal schedule and/or approach.

As mentioned, in some embodiments the majority of the communications can be handled through peer-to-peer communications amongst the peer devices, but there can be at least some communications to a game controller or central server as needed. For example, the game controller might store authoritative game state data, which can be used to roll back the clients in response to a determined inconsistency. The game controller can also run metrics on the historical data and game state data to attempt to determine trends or patterns that indicate a likelihood of a particular player trying to game the system, or a particular game installation being problematic, among other such issues. One of the peers might be responsible for requesting an action from the game controller, but any or all of the relevant peers might communicate with the controller for various reasons as discussed and suggested herein. In some embodiments the game controller might store only the game state data used for the hashing, but in other embodiments the game controller can obtain and store an authoritative snapshot of all relevant state data for the game session, including data not otherwise represented in the hashes.

When selecting a peer device to act as the authority manager on the session, the peer can be rotated over time. In some embodiments this will cycle such that every peer gets a chance to manage the session, if they stick around long enough, while in other embodiments a subset of the peers will be selected for management and the responsibility will cycle within that group, among other such options. The change can use any appropriate approach, such as a round robin based approach, a random selection approach, or an approach based on determined likelihood of un-manipulated operation, etc.

In some embodiments a more robust comparison can be performed for a final result. For example, a more lightweight analysis can be done during the game to attempt to minimize the impact on gameplay and player experience. This analysis might compare only a small set of values selected as primary indicators of tampering. At the end of the game, however, before a final winner or outcome is determined, a more robust comparison can be performed that looks at various totals or other factors for the various players to ensure that the various devices come to a consensus as to the outcome based on relevant data for the session.

Figure 4:
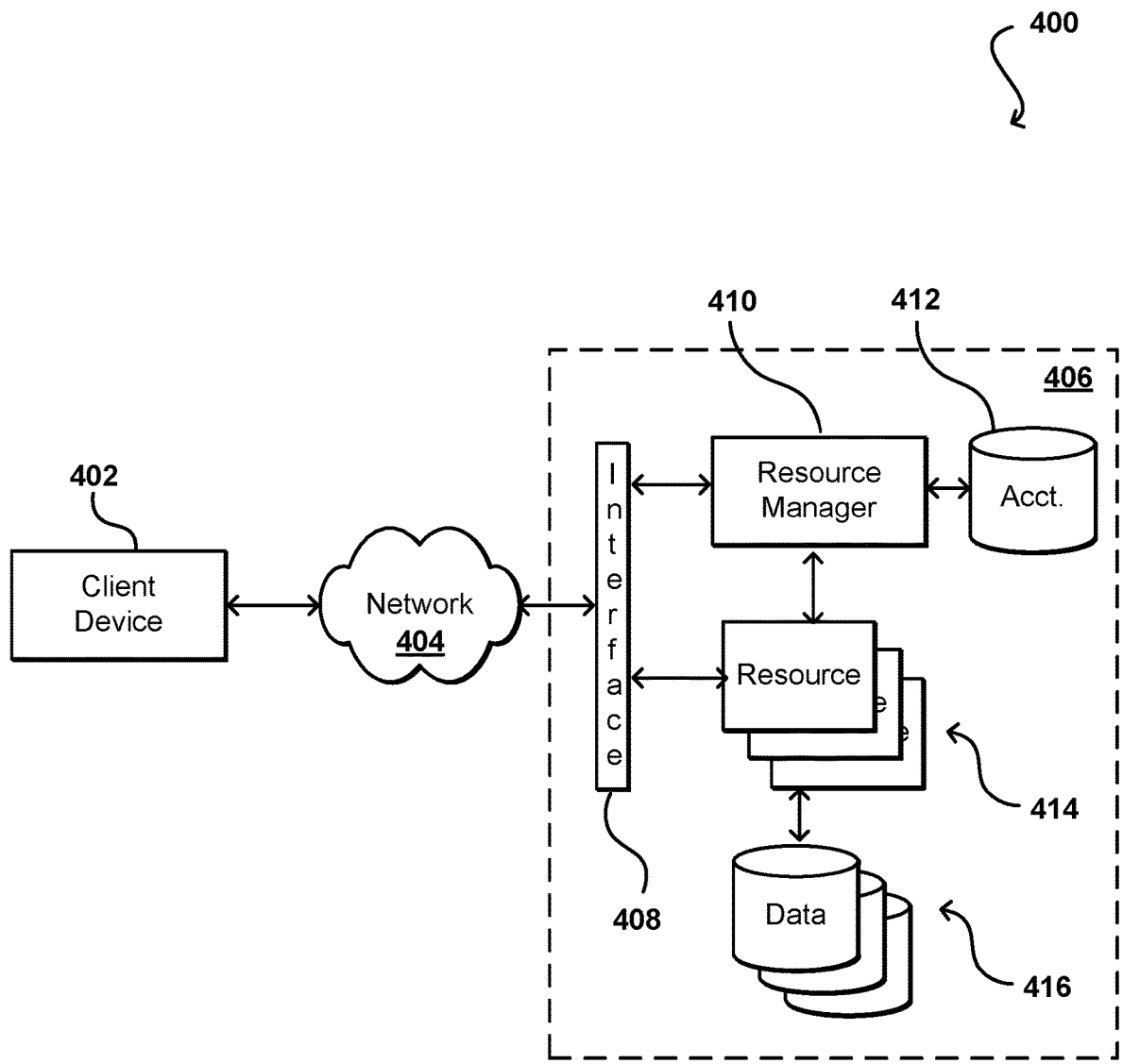
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
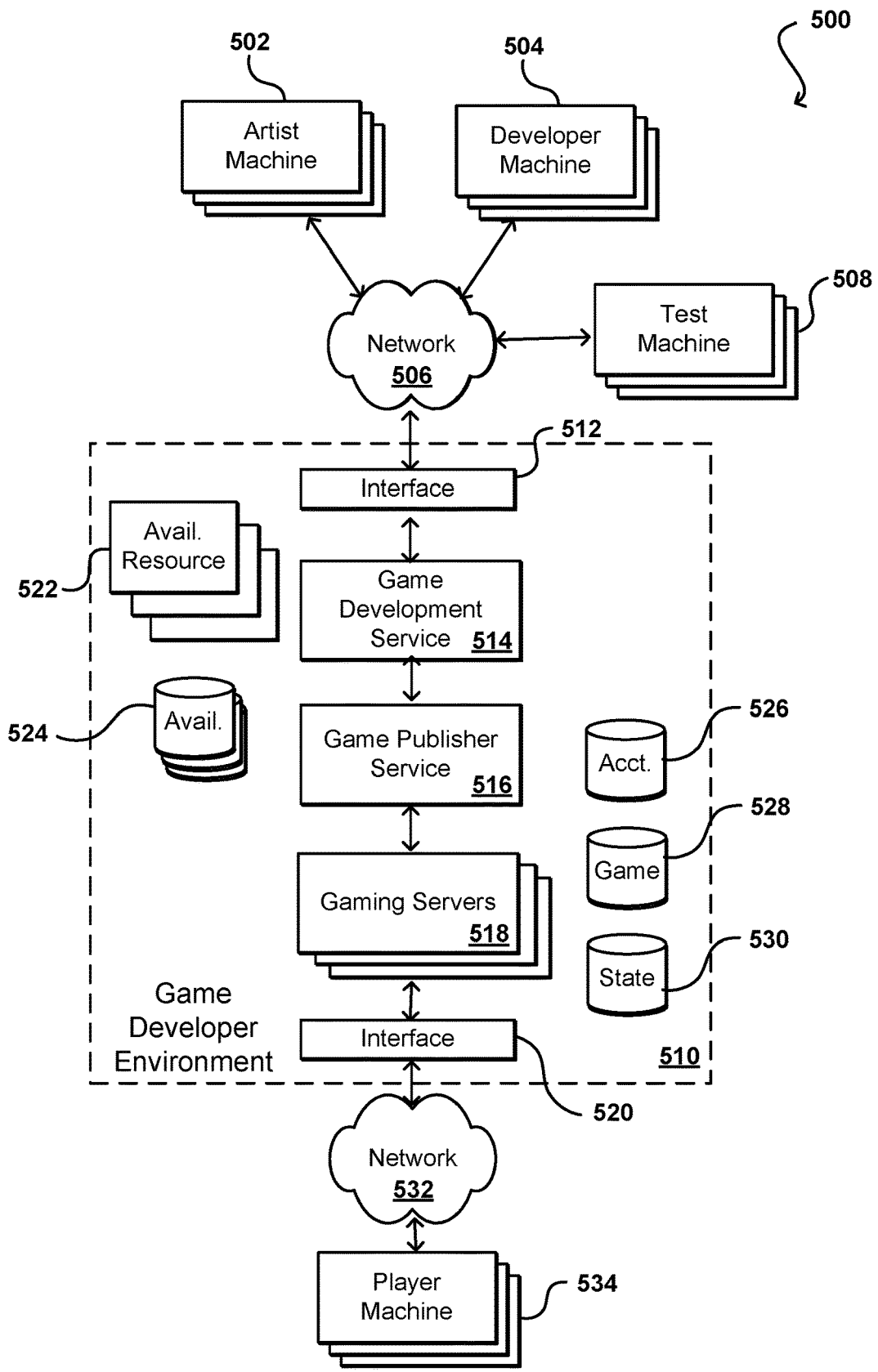
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in a game developer environment 510, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. As mentioned, in some embodiments the devices can send position or image data to a dedicated gaming server 518 or other component in the game developer environment 510, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 534 in order for those devices to render the appropriate AR content for the location and orientation of a given device. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 6:
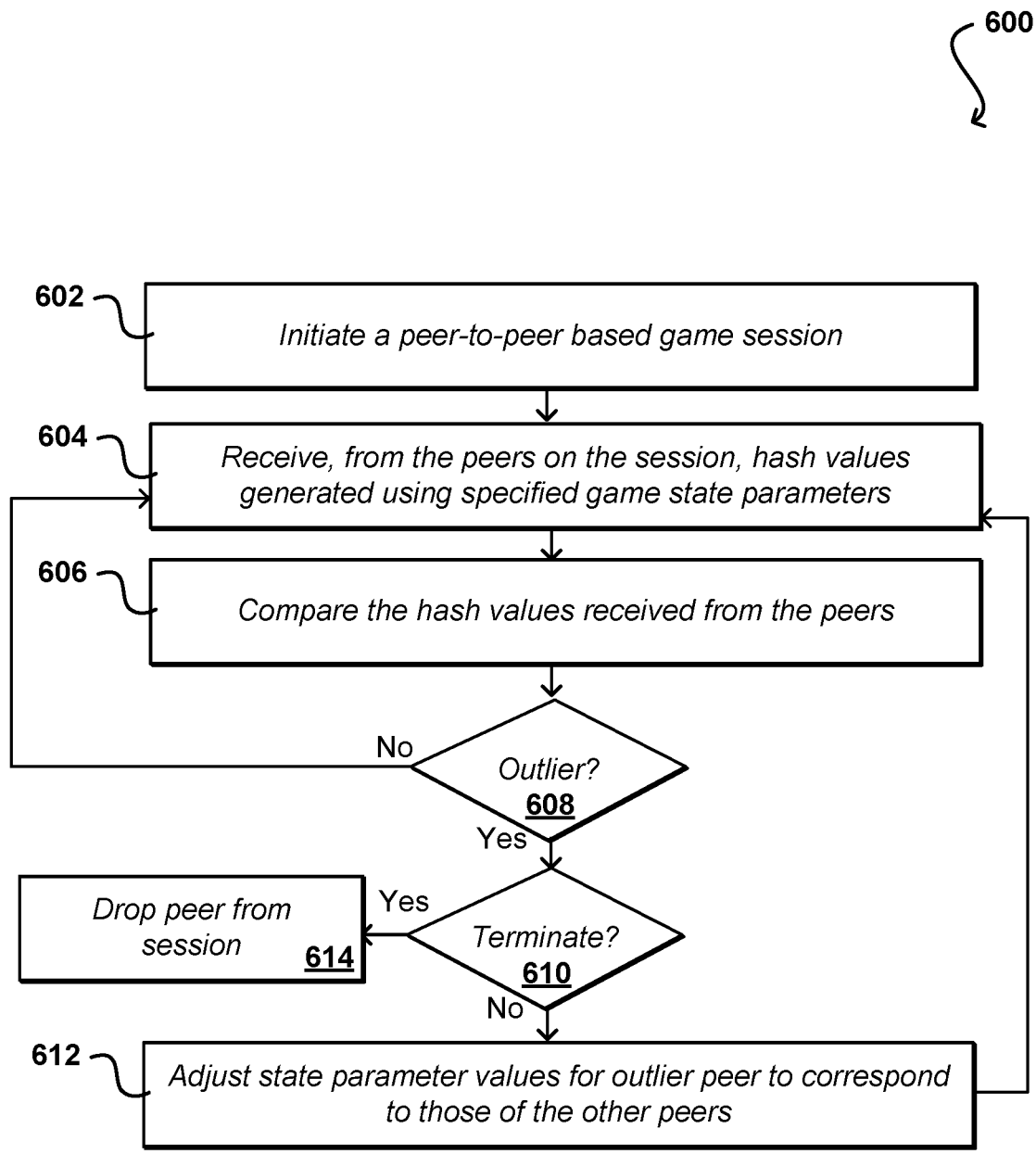
FIG. 6 illustrates an example process for . . . that can be utilized in accordance with various embodiments.

FIG. 6 illustrates an example process 600 for maintaining authority over a peer-to-peer based game that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a peer-to-peer-based game session is initiated 602 for a specified gaming application. As mentioned, this can be initiated by the peers themselves or from a centralized controller or server, among other such options. Each peer client participating in the game can execute a local copy of the game application, and can report input actions received by that peer client, such as from one or more local users. The information can be passed amongst the peers using the peer connections so that all peers to the session have substantially the same state data, allowing for some slight variations due to latency and timing.

As mentioned, it can be desirable in at least some embodiments to ensure that these peer clients do not provide false or manipulated state data which might provide the respective player with an advantage in the game or that negatively impacts the other players to the game. Accordingly, the state data stored by the various peer clients can be compared to ensure that none of the clients is reporting actions or results that differ from those of the other clients. As mentioned, in some embodiments all the state data may be compared, while in other embodiments there may be a specified subset of values that are examined for authoritative purposes. The values can be sent encrypted or unencrypted, but in some embodiments a hash of these values is sent to provide for a more lightweight and quickly comparable solution. Each peer client can then, at the appropriate interval or times, generate a hash of the specified values using a specified hashing algorithm. These hash values can be sent from the peer clients along the peer connections, and can be received 804 by all the peers or by a designated master peer, among other such options. An entity such as a designated master peer can then compare 606 the hash values received from the various peer clients. If it is determined 608 that the hash values are all the same and there are no outliers then the session can continue without modification. If, however, at outlier is identified then an analysis of data for that outlier can be performed to determine 610 whether a termination criterion has been satisfied for that outlier peer. As mentioned, this might include reaching at least a minimum or threshold number or frequencies of being an outlier, a type of difference, and the like. If a termination criterion is met then the outlier peer client can be dropped 614 from the session. If the criterion is not met or satisfied then the process can instead attempt to bring the outlier peer back in sync with the other peer clients. In this example, one or more of the game state parameters for the outlier peer can be adjusted 612 to correspond to those of the other peers. This can include setting individual state values or all state values for the outlier peer to match those of the other peers, or roll back the state values for all peers to a last known, or other prior, good state, among other such options. The session can be allowed to continue as long as the peers are substantially in sync. Individual outlier peers can be modified as discussed to attempt to keep those peers in the session. If there are an excessive number of outliers, or if there is little consistency across the peers, then the session as a whole may be terminated.

Figure 7:
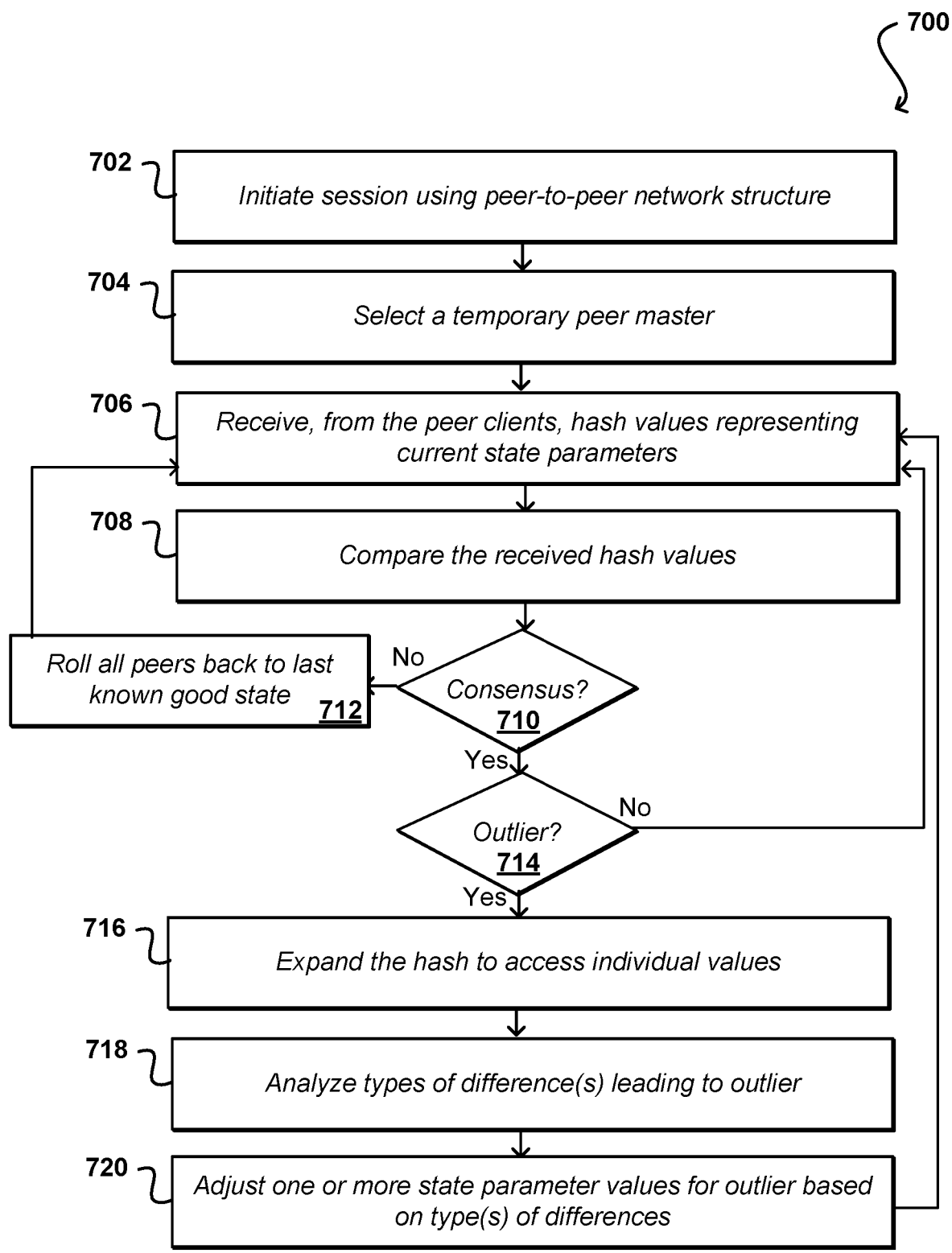
FIG. 7 illustrates an example process for . . . that can be utilized in accordance with various embodiments.

FIG. 7 illustrates another example process 700 for maintaining authority in a peer session that can be utilized in accordance with various embodiments. In this example a session is initiated 702 using a peer-to-peer network structure as discussed previously. A temporary peer master is selected 704 from the available peer clients. As discussed, the selection may come from all peers or a designated subset of peer clients, and the selection may be random or according to a specified selection function, among other such options. The selected master can be responsible for authoritative actions for the session for a period of time. As mentioned, the responsibility can be rotated at relatively short intervals in some embodiments to prevent the master client from cheating on the session, although the length of time can vary based upon factors such as the number of peers and type of session. During the session, hash values representing the current state values can be received 706 from the various peer clients, such as is discussed with respect to FIG. 6. In this example the hash values will be received by the master peer, which can compare 708 the received has values. As discussed, this can involve comparing the values to determine whether all the values are the same or, if there are differences, if a consensus can be reached amongst the received values. If it is determined 712 that no consensus can be reached, then the peer clients can be rolled back 712 to the last known good state, or the last time where at least a consensus of peers, if not all peers, agreed as to the values of the state parameters. If there are no such values then the peers can be reset to default values or the session can be terminated, among other such options.

If consensus can be reached, another determination (or part of the same determination) can be made 714 regarding the presence of any outlier peers, or peer clients reporting a hash value that differs from the consensus hash value. If there are no such outliers then the session can continue without modification. If, however, at outlier is identified then the outlier hash value can be expanded 716 to access the individual values. The consensus hash can also be expanded for reference in at least some embodiments. The values can be examined and the types of differences analyzed 718 that resulted in the outlier state. This can include determining a type of parameter involved, whether the outlier value is a benefit to that player or detriment to other players, whether the value makes sense for that parameter, etc. Based at least on the types of differences detected, along with other factors discussed and suggested herein, the value for one or more state parameters of the outlier can be adjusted. This can include, as mentioned, setting the values to match the current values of the other peers, last known good values, default values, etc. The adjustment may also depend at least in part upon the historical behavior of the outlier peer, as peers with more frequent outlier status may be adjusted more significantly than peers that only occasionally have a glitch in one of the values, etc.

Figure 8:
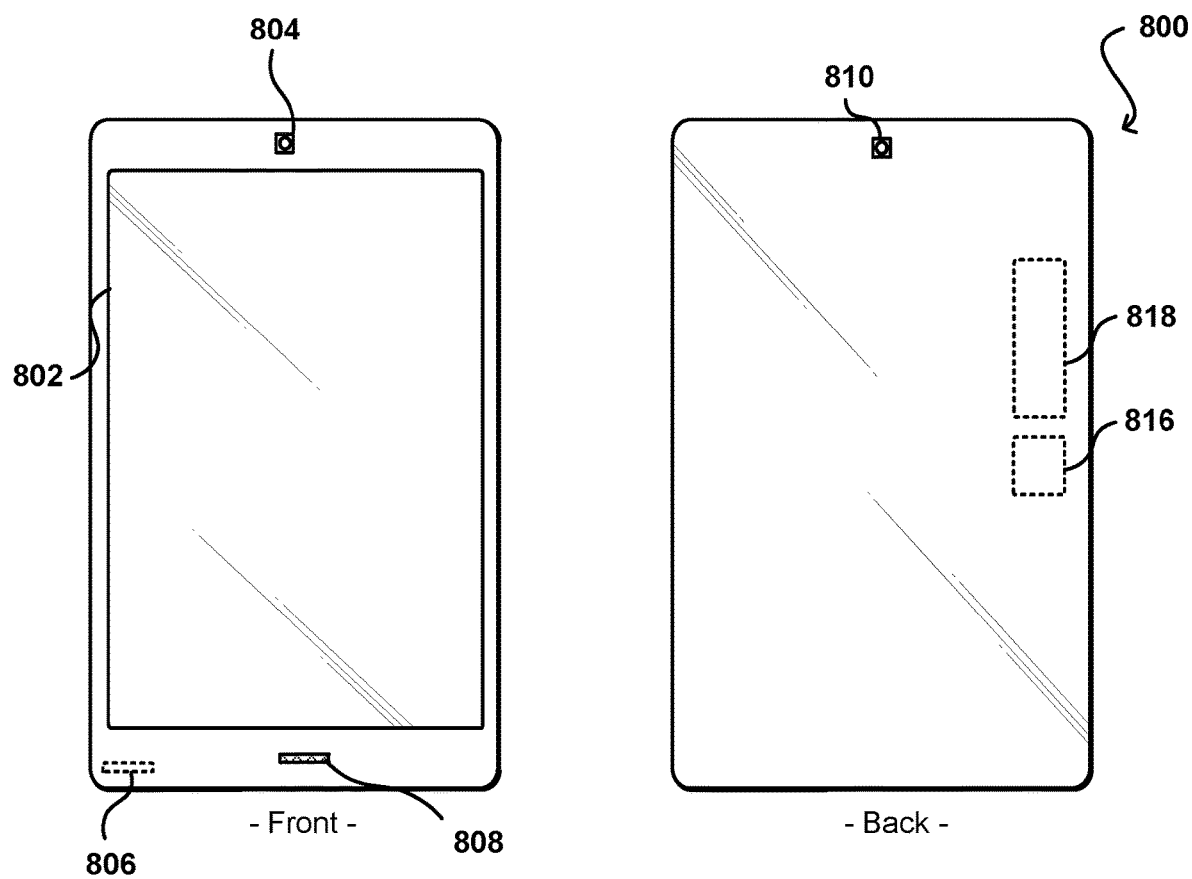
FIG. 8 illustrates an example computing device that can execute an augmented reality application in accordance with various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display screen of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 808 on the front side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 806, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
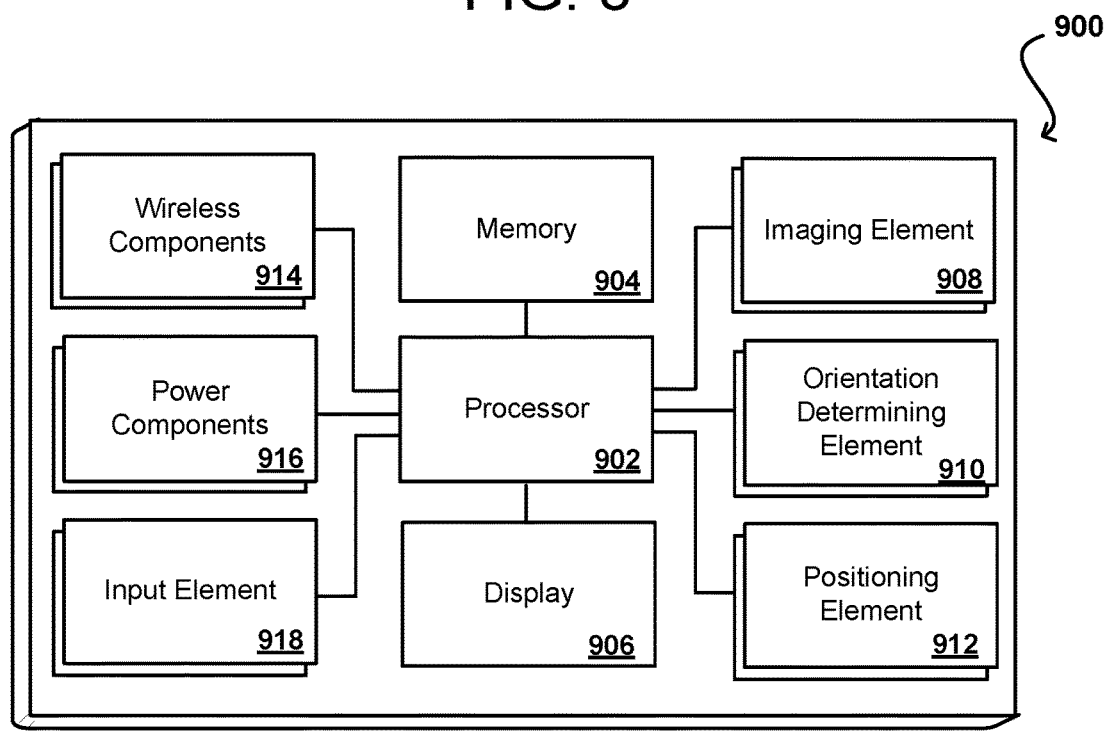
FIG. 9 illustrates example components of a computing device that can be used to implement aspects of the various embodiments.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    initiating a multiplayer gaming session for a plurality of peer clients executing a game application;
    periodically rotating master peer responsibility for authoritative actions among at least a subset of the plurality of peer clients;
    receiving, from the peer clients, hash values generated using game state data, the hash values being obtained at determined times, for the multiplayer gaming session stored by the peer clients;
    determining, from the received hash values, a consensus hash value returned by at least a threshold number of peer clients;
    determining, using the peer client having the master peer responsibility, an outlier peer client having an outlier hash value different from the consensus hash value;
    setting the game state data for the outlier peer client to match the game state data corresponding to the consensus hash value in response to determining the outlier peer client does not satisfy a termination criterion; and causing the outlier peer client to be dropped from the multiplayer gaming session in response to determining the outlier peer client satisfies the termination criterion.

2. The computer-implemented method of claim 1, further comprising:
selecting, from among the plurality of peer clients, a temporary peer client to have the master peer responsibility responsible for determining the outlier peer.

3. The computer-implemented method of claim 1, further comprising:
selecting a set of state parameters to be used to obtain the game state data for the peer clients; and
sending the set of state parameters to the plurality of peer clients for the multiplayer gaming session.

4. The computer-implemented method of claim 3, further comprising:
expanding the outlier hash value to identify values for the set of state parameters for the outlier peer; and
setting a consensus value for at least one of the state parameters for the outlier peer.

5. The computer-implemented method of claim 1, further comprising:
storing outlier data for the outlier peer over time; and
comparing the outlier data against the termination criterion to determine whether to cause the outlier peer client to be dropped from the multiplayer gaming session.

6. A computer-implemented method, comprising:
periodically rotating master peer responsibility for authoritative actions among at least a subset of a set of peer clients on a game session;
receiving, by a peer-to-peer connection, hash values from the set of peer clients, the hash values generated using game state data, the hash values being obtained at determined times, stored by the peer clients;
comparing, using the peer client having the master peer responsibility, the hash values of the peer clients to determine a consensus hash value; and
adjusting the game state data stored on an identified peer in response to the hash value, received from the identified peer, differing from the consensus hash value.

7. The computer-implemented method of claim 6, further comprising:
selecting, from among the set of peer clients, a temporary peer client to have the master peer responsibility to compare the hash values adjust the game state data.

8. The computer-implemented method of claim 7, further comprising:
rotating temporary master responsibility among at least the subset of the set of peer clients during the game session.

9. The computer-implemented method of claim 6, further comprising:
specifying a set of game state parameters for generating the game state data, at least a subset of the game state parameters corresponding to a game object or an action taken by a player character.

10. The computer-implemented method of claim 6, further comprising:
causing a non-player client to function as a peer client on the game session, the non-player client configured to provide an unbiased has value using the game state data.

11. The computer-implemented method of claim 6, further comprising:
adjusting the game state data by setting the game state data for the set of peer clients to a prior set of game data for which the set of peer clients returned the consensus hash value.

12. The computer-implemented method of claim 6, further comprising:
expanding the hash values to identify values for the set of state parameters; and
setting a consensus value for at least one of the state parameters for at least the identified peer.

13. The computer-implemented method of claim 6, further comprising:
storing outlier data for the identified peer over time; and
comparing the outlier data against a termination criterion to determine whether to cause the identified peer to be dropped from the game session.

14. The computer-implemented method of claim 13, further comprising:
sending a message to an address associated with the identified peer indicating a potential issue with the identified peer as determined from the outlier data.

15. The computer-implemented method of claim 6, wherein the consensus hash value is able to be determined by at least a minimum number of peers for which the hash values are received.

16. A system, comprising:
at least one processor; and
memory including instructions that, when executed by the at least one processor, cause the system to:
periodically rotate master peer responsibility for authoritative actions among a set of peer clients;
receive, by a peer-to-peer connection, hash values from a set of peer clients on a game session, the hash values generated using game state data, the hash values being obtained at determined times, stored by the peer clients;
compare, using the peer client having the master peer responsibility, the hash values of the peer clients to determine a consensus hash value; and
adjust the game state data stored on an identified peer in response to the hash value, received from the identified peer, differing from the consensus hash value.

17. The system of claim 16, wherein the instructions when executed further cause the system to:
select, from among the set of peer clients, a temporary peer client to have the master peer responsibility to compare the hash values and adjust the game state data.

18. The system of claim 16, wherein the instructions when executed further cause the system to:
expand the hash values to identify values for the set of state parameters; and
set a consensus value for at least one of the state parameters for at least the identified peer.

19. The system of claim 16, wherein the instructions when executed further cause the system to:
store outlier data for the identified peer over time; and
compare the outlier data against a termination criterion to determine whether to cause the identified peer to be dropped from the game session.

20. The system of claim 16, wherein the instructions when executed further cause the system to:
adjust the game state data by setting the game state data for the set of peer clients to a prior set of game data for which the set of peer clients returned the consensus hash value.

* * * * *